United States Patent [19]

Neumann et al.

[11] Patent Number: 5,599,028
[45] Date of Patent: Feb. 4, 1997

[54] SEAL BETWEEN TWO ELEMENTS, ESPECIALLY BETWEEN CONCRETE PIPES

[75] Inventors: Wieland Neumann, Möchengladbach; Helmut Mehl, Weilburg, both of Germany

[73] Assignee: Forsheda AB, Forsheda, Sweden

[21] Appl. No.: 115,879

[22] Filed: Sep. 1, 1993

[30] Foreign Application Priority Data

Sep. 4, 1992 [DE] Germany .......................... 42 29 609.9

[51] Int. Cl.[6] ............................................... F16J 15/10
[52] U.S. Cl. ...................... 277/199; 277/207 A; 277/226
[58] Field of Search .......................... 277/34, 34.3, 186, 277/190, 193, 199, 207 A, 226

[56] References Cited

U.S. PATENT DOCUMENTS

| 2,924,472 | 2/1960 | Bush | 277/190 |
| 4,299,399 | 11/1981 | Haaland | 277/207 |
| 4,641,858 | 2/1987 | Roux | 277/207 A X |
| 4,871,180 | 10/1989 | Preisendörfer | 277/207 A |
| 4,934,716 | 6/1990 | Nordin et al. | 277/207 |
| 4,946,175 | 8/1990 | Nordin et al. | 277/207 A |
| 5,064,207 | 11/1991 | Bengtsson | 277/207 A |

FOREIGN PATENT DOCUMENTS

| 0343677 | 5/1989 | European Pat. Off. . | |
| 2504636 | 10/1982 | France | 277/207 A |
| 1924410 | 11/1970 | Germany | 277/207 A |
| 4112976 | 10/1992 | Germany . | |
| 0511720 | 8/1939 | United Kingdom | 277/207 A |
| 8102336 | 8/1981 | WIPO | 277/207 A |

Primary Examiner—William A. Cuchlinski, Jr.
Assistant Examiner—John L. Beres
Attorney, Agent, or Firm—Baker & Daniels

[57] ABSTRACT

A seal for concrete pipes wherein the sealing function can be controlled by varying the relative change of length under compression, the hardness of the elastomeric material or a combination of the two. The elastomeric body is of wedge-shaped cross section wherein the wedge-shaped end is positioned at the front in the direction of introduction of the pipe end. The elastomeric body further includes a base end having an introduction opening to a reception space. An attachment portion is anchored in the reception space of the elastomeric body and is adapted to control the degree of compression of the elastomeric body.

15 Claims, 5 Drawing Sheets

SEAL BETWEEN TWO ELEMENTS, ESPECIALLY BETWEEN CONCRETE PIPES

BACKGROUND OF THE INVENTION

The present invention relates to a seal between two elements which are insertable one in the other, especially pipes, preferably consisting of concrete.

Elements which are insertable one in the other, for example concrete pipes according to DIN 4032 and 4035, are usually sealed in relation to each other by means of elastomeric material seals which can be designed as roller rings or sliding seals. With regard to sliding seals DE-OS 29 00 437 describes a sealing ring for sealing the space between two substantially concentric sealing surfaces, the sealing ring consisting of two sealing portions each having a sliding surface, the sealing portions engaging each other at the sliding surfaces and being designed so that the sealing surfaces are maintained in substantially the same position when the sealing surfaces are introduced one in the other, engage a sealing surface each and slide against each other along the sliding surfaces. The sealing ring can be provided with a lubricant or sliding substance. In this embodiment of a sealing ring it is a drawback that the lubricant dries or hardens whereupon the sealing portions of the sealing ring can no longer efficiently slide against each other. This drawback is obviated in accordance with the European Patent Application EP 0 343 677 according to which there is proposed a seal between two prefabricated concrete elements which are insertable one in the other, wherein a sealing element is connected with one of the concrete elements and cooperates with a covering on the adjacent concrete element, the covering consists of a flattened hose filled with lubricant or a folded or single foil and the covering can be positioned on its concrete element just prior to the jointing of the concrete elements.

The sealing function of a seal, for example a seal according to the European Patent Application EP 0 343 677, is determined by the sealing force of the seal. When the sealing force is small, i.e. at a small deformation resistance of the seal, there is a risk of untightness, while a high deformation resistance provides for a more difficult jointing which may lead to fractures within the area of the pipe socket. Additionally there is in prefabricated concrete elements certain manufacturing tolerances providing for different space widths between tubular elements introduced one in the other, for which reason it is desirable to have access to seals sealing different space widths at one and the same sealing force.

For other fields of application it is desirable in a suitable way to be able to adjust the space width of the pipe joint and the sealing force of the seal in relation to each other.

SUMMARY OF THE INVENTION

Thus, the object of the invention is to provide a seal between elements, wherein the sealing function can be individually adjusted.

This object is according to the invention satisfied by the features defined in claim 1 and is further developed by means of the features defined in the sub claims.

In summary the seal according to the invention comprises a compression seal having a wedge-shaped elastomeric body and an attachment element which is fastened to or in the elastomeric body.

As previously known, the sealing function of a seal is influenced by the sealing force of the compressed elastomeric material. Generally the sealing force of an elastomeric material is a function of the relative elastic deformation $w/w_0$ ($w_0$=the height of the sealing element in uncompressed unloaded condition, $w$=the height of the sealing element in compressed, loaded condition) provided by the compression in relation to the non-compressed condition, and the hardness $H$ of the material which in turn can be influenced by the degree of cross-linking $n$ of an elastomeric material. Thus, the following formula is valid $$F_{seal} = f(w/w_0, H(n)) \qquad 1.$$

Thus, in principle there are several possibilities of controlling the sealing function of an elastomeric seal by a variation of the relative change of length under compression, the hardness of the elastomeric material or a combination of these two possibilities.

In a preferred embodiment of the invention the first possibility is utilized, the attachment element consisting of a retainer portion and a sliding jacket, the retainer portion being fastened in a correspondingly designed reception space of the elastomeric body and the sliding jacket extending so as to cover the sliding surface of the elastomeric body. By choosing the thickness of the wall and material of the sliding jacket it is i.a. possible to control the total height of the seal in order to control the relative change of length after the jointing of the concrete pipes and thereby the sealing force and tightness of the seal.

In a further preferred embodiment the material properties of the attachment element can be varied and the attachment element extends in the direction of introduction preferably along about one half of the size of the elastomeric body in the direction of introduction and has a bearing surface for an elastomeric compression material positioned in an area between the sliding surface and the wedge base end. By changing the material properties of the attachment element it is possible to change the total hardness of the seal and thereby the sealing force of the seal and in accordance therewith the tightness according to formula 1.

Different embodiments of the invention shall be described in the following with reference to the accompanying drawings.

DESCRIPTION OF THE PREFERRED EMBODIMENTS

Figure 1:
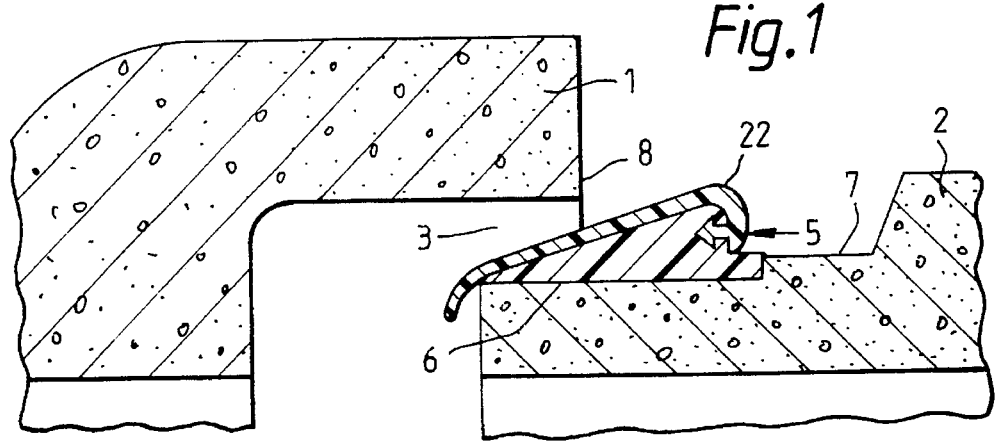
FIG. 1 is a cross-section of the walls in the area of a pipe joint including a first embodiment of a seal according to the invention.

In FIG. 1 there is shown a socket end and a spigot end 2 of two adjacent concrete pipes which are introducable one in the other and which are separated from each other by means of an annular space 3. In the area of this annular space 3 there is positioned a seal 5 on the spigot end 2. The seal 5 is positioned in an annular recess 6 on the spigot end 2, and behind the recess there is provided a raised section 7. The object of this construction is to provide that the socket I shall in the jointed condition at very high radial forces engage the raised section 7 so that further compression and thereby destruction of the seal 5 is to be obviated.

Figure 2:
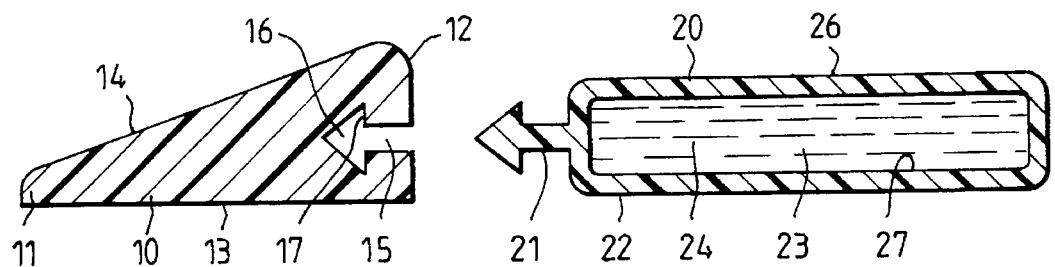
FIGS. 2 and 3 show different embodiments of seals having an elastomeric body and an attachment element.
Figure 4:
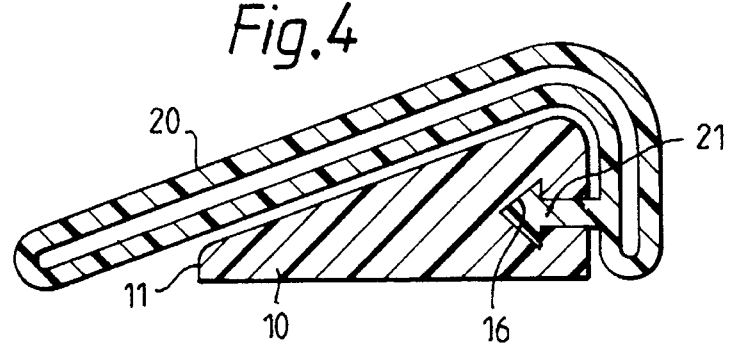
FIG. 4 shows a seal having an elastomeric body and a covering attachment element.

FIGS. 2 and 4 show a first embodiment of the seal 5. The annular seal 5 is constituted by an annular elastomeric body 10 and an attachment portion 20.

The elastomeric body 10 is of wedge-shaped cross-section having wedge edge portion 11, a wedge base end 12, a bearing surface 13 and a sliding surface 14, the wedge edge portion 11 being positioned at the front end in the direction of introduction of the concrete element 2 and the wedge base end 12 having an introduction opening 15 to a reception and anchorage space 16. The anchorage space 16 can be of arrow shape in its axial section in order to form two shoulders 17. The attachment portion 20 consists of a sliding jacket 22 and an anchorage or retainer portion 21 by means of which the attachment portion is fastened in the reception space 16 of the elastomeric body 10. The sliding jacket 22 can be designed as a hose. The inner space 23 of the hose is filled with a lubricant 24 which preferably has a low viscosity so that the radially outer wall 26 of the hose and the radially inner wall 27 of the hose can easily be displaced along each other. The sliding jacket can also be formed as a single collar (FIG. 1).

The attachment portion 20 can as a whole be formed as a profiled strand but it is also possible to vulcanize the retainer portion 21 to the hose-shaped sliding jacket 22.

Figure 3:
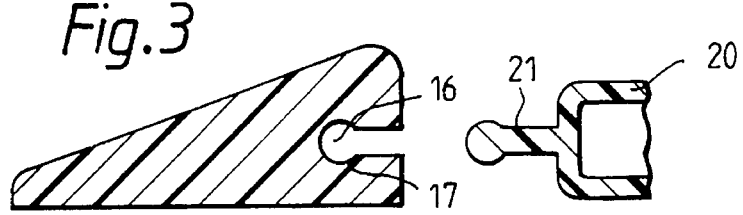

In FIG. 3 there is shown another embodiment of the anchorage space 16 in the elastomeric body and the anchorage or retainer portion 21 of the attachment portion 20. Instead of the triangular anchorage space 16 there is an anchorage space 16 having a circular cross-section and a corresponding retainer portion 21 on the attachment portion. The retainer portion 21 of the attachment portion is in accordance therewith formed as a bead having a substantially circular cross-section.

In operation the sliding jacket 22 is folded over the sliding surface 14 of the elastomeric body 6 as shown in FIGS. 1 and 4, a portion of the sliding jacket extending past the wedge edge end 11 in a non-compressed condition. When the concrete portions 1, 2 are introduced one in the other the peripheral edge 8 of the socket end 1 will engage the radially outer wall 26 of the covering hose 22, as appears from a comparison between FIG. 1 and FIGS. 5 and 6. The whole hose will be displaced in the direction of the raised section 7 and thereby slides over the sliding surface 14 of the elastomeric body 10 which never comes into a direct contact with the concrete. As a consequence of the sliding of the radially outer wall 26 of the hose against the radially inner wall 27 of the hose the hose is displaced away from the wedge edge portion 11 towards the raised portion 7, the hose providing a coverage obstructing the friction against the concrete.

Figure 5:
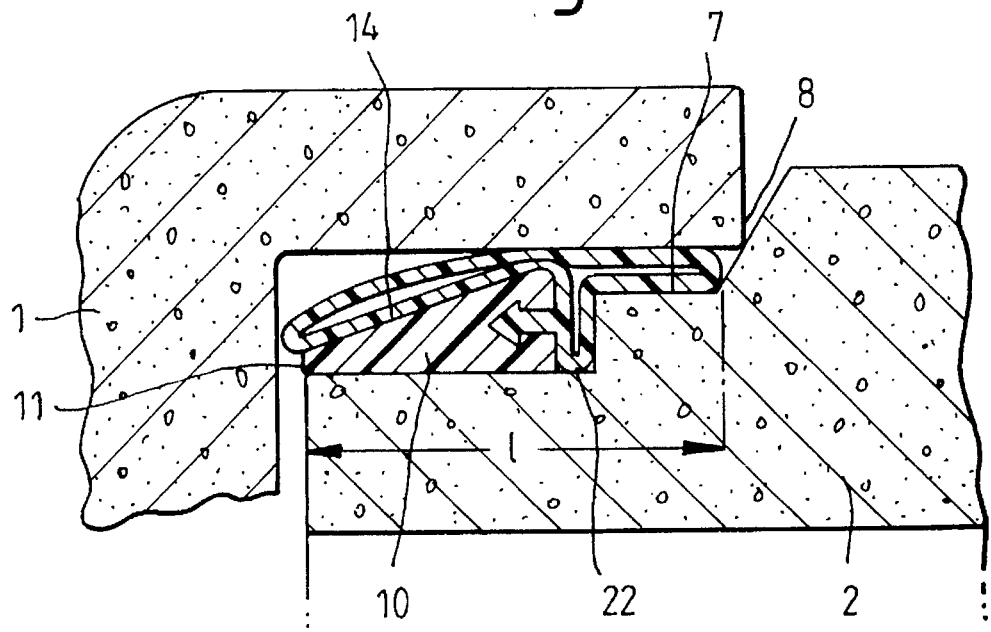
FIGS. 5 and 6 show seals having an elastomeric body and a sliding jacket in pipe joints at different jointing stages.
Figure 6:
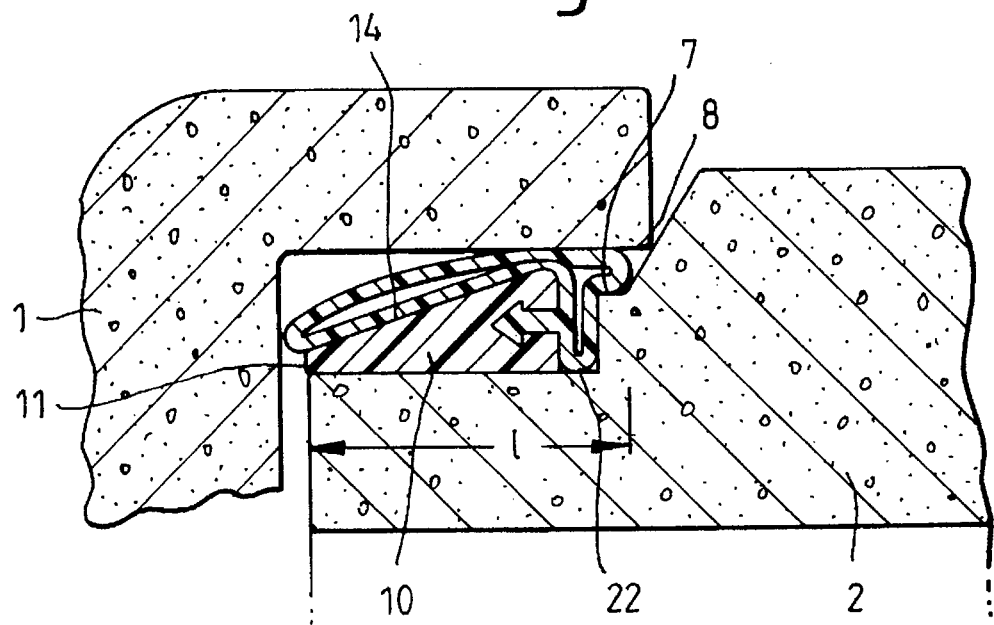

The manufacturing of the seal from separate portions which can be firmly connected with each other makes it possible to seal two concrete elements having different lengths of introduction as shown in FIGS. 5 and 6 while using one and the same elastomeric body 10. Thus, it is possible to provide a set of different attachment portions 20 having long and short, thicker and thinner sliding jackets 22. Also the thickness of the anchorage or retainer portion 21 can be modified within certain limits. Finally also the hardness of the material used for the attachment portion can be adapted to provide more or less compressibility of the seal 5. The different combinations also make it possible to provide prefabricated series of concrete elements with suitable seals also in the case that there are certain deviations of the widths of the sealing spaces.

Figure 7A:
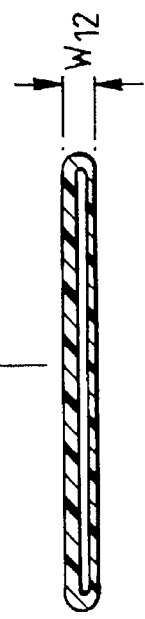
FIGS. 7 and 8 show attachment elements having different wall thickness at constant sealing force.
Figure 7B:
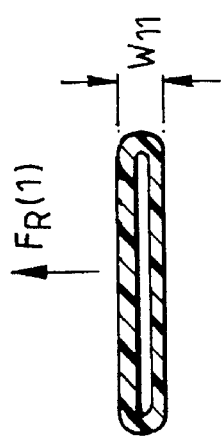
Figure 7C:
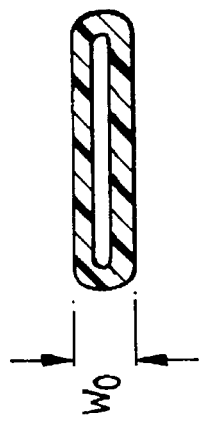
Figure 8A:
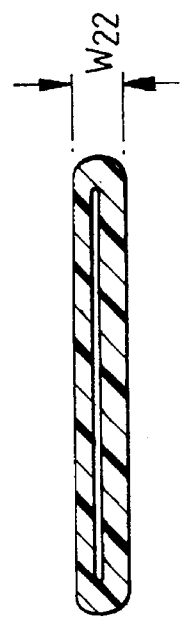
Figure 8B:
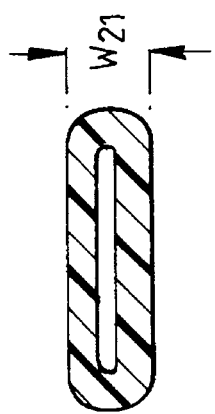
Figure 8C:
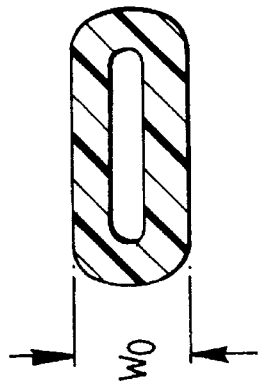

By the fact that the sliding jacket is folded over the upwards sloping bearing surface on the elastomeric body it is possible by changing the wall thickness of the sliding jacket to change the total height of the sealing element comprising the elastomeric body 10 and the attachment portion 20 in the uncompressed condition thereof. It is thereby possible as shown in FIGS. 7 and 8 to seal annular spaces having different widths at the same sealing force $F_s$ and thereby the same sealing function of the total sealing element. The wall thicknesses are different which means that also their thicknesses in uncompressed condition are different. As the sealing force is dependent on the relative change of the thickness the seals will, as shown in FIGS. 7 and 8, at the same sealing force $F_s(1)$ and $F_s(2)$ in the compressed condition have different absolute thicknesses $w_{11}$, $w_{21}$ and $w_{12}$, $w_{22}$; i.e. different space widths can be sealed at sealing forces of the same magnitude.

Figure 9A:
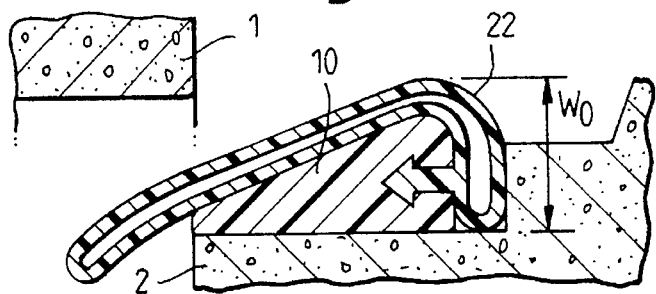
FIGS. 9 and 10 show a seal having different attachment elements at constant degrees of compression.
Figure 9B:
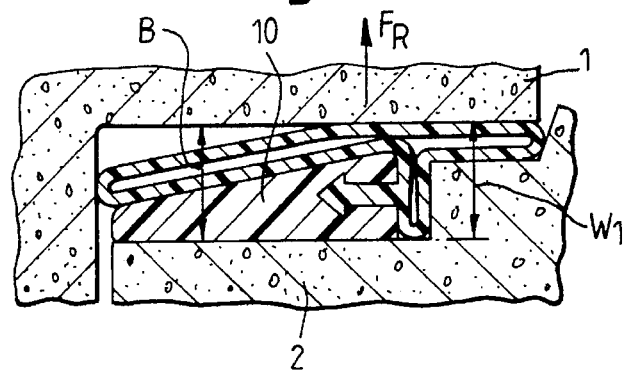
Figure 10A:
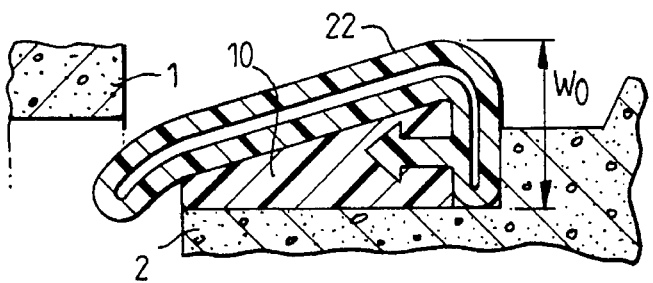
Figure 10B:
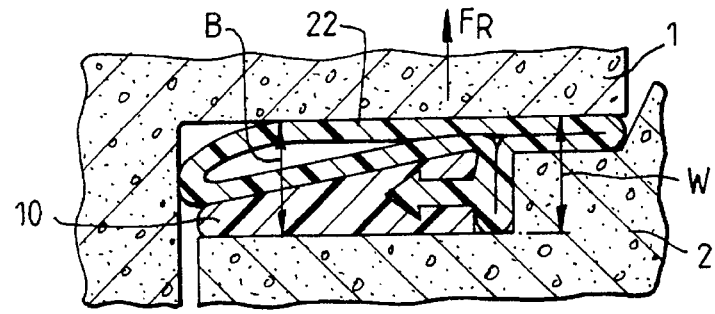

As shown in FIGS. 9 and 10 it is also possible to control the sealing force at uniform space widths B by the choice of sliding jackets. For a sliding jacket having a larger wall thickness of the inner and outer walls (FIG. 10a) there is after compression (FIG. 10b) established a substantially higher sealing force than in connection with a sliding jacket of the same material at smaller wall thicknesses (FIG. 9b).

Figure 11A:
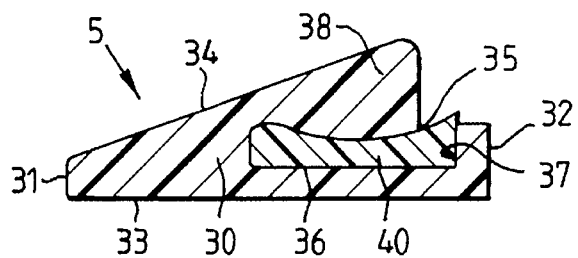
FIGS. 11 and 12 show embodiments of an elastomeric body having an elastomeric compression material and an attachment element.
Figure 11B:
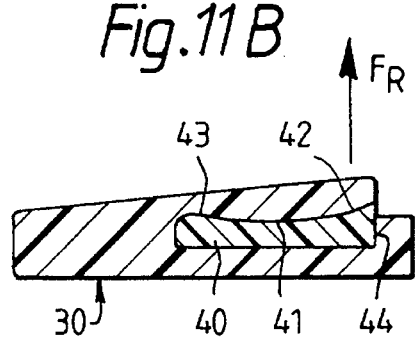
Figure 12A:
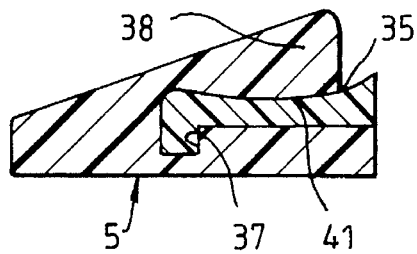
Figure 12B:
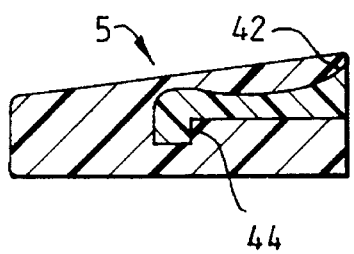
Figure 13:
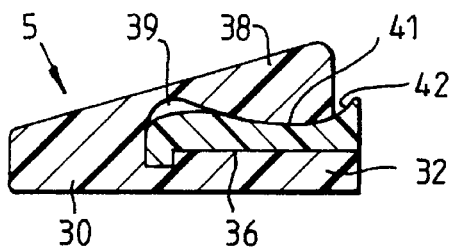
FIG. 13 shows an elastomeric body and an elastomeric compression material and an attachment element and a reception space for a lubricant.

FIGS. 11 to 13 show a second group of seals 5 offering possibilities of variation, the seals having an elastomeric body 30 and an attachment portion 40, the compression force of the seal 5 being controlled by using attachment portions of different thicknesses and/or material hardnesses.

Also in this case the elastomeric body 30 has a wedge edge end 31, a wedge base end 32, a bearing surface 33 and a sliding surface 34, an introduction opening 35 to a reception space 36 being provided in the wedge base end 32. In the reception space 36 there is provided a shoulder 37 providing for a retaining of the attachment portion 40. Between the reception space 36 and the sliding surface 34 there is provided an annular flap 38 consisting of an elastomeric compression material.

The attachment portion 40 has a saddle-shaped bearing surface 41 provided with an upwardly directed surface 42 and a sloping surface 43. The attachment portion 40 is provided with an additional support surface 44 cooperating with the shoulder 37 for preventing the attachment portion 40 from sliding out from the reception space 36. In the embodiment according to FIG. 11 the surfaces 37/44 are positioned close to the introduction opening 35 while these surfaces in the embodiment according to FIG. 12 are positioned close to the center of the seal.

When introducing the prefabricated concrete portions one in the other the annular edge 8 of the socket contacts the sliding surface 34, compresses the compression material 38 to some degree and displaces the material 38 to the right according to the drawing in the course of a compression process. The forces which are thereby appearing are to large extent dependent on the shape and the resiliency of the attachment portion 40. In order to facilitate the introduction of the concrete portions one in the other it is desirable that the forces are at the introduction of the portions one in the other not too large; for which reason the surface 41 is saddle-shaped. This provides that the introduction is at an initial stage easy to conduct and that there is not until the edge 8 in the axial direction is moved over the portion 42 required larger forces thereby leading to the establishment of the desired, high sealing pressure of the seal.

In order to reduce the jointing forces created at the jointing of two prefabricated concrete elements it is suitable to lubricate the surfaces of the space between the compression material 38 and the bearing surface 41. For this object there is in an embodiment of the invention as shown in FIG. 13 provided a lubricant pocket 39 in the reception space 36, which is designed as an annular channel and is filled with a lubricant prior to the positioning of the attachment portion. When the seal is compressed as a consequence of the introduction of the concrete elements one in the other the lubricant is squeezed out from the lubricant pocket 39 to the wedge space end 39 of the elastomeric body 30, which provides a lubrication of the bearing surface 41 of the elastomeric compression material 38.

Figure 14:
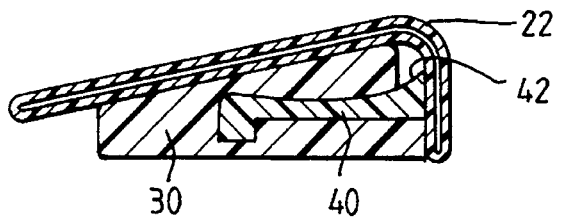
FIG. 14 shows a combination of an elastomeric body having a reception space with a curved bearing surface and a sliding jacket.

FIG. 14 shows an embodiment in which a sliding jacket 22 is fastened (for example by means of an adhesive) to the attachment portion 40 providing the possibilities shown with reference to FIGS. 1–8.

Thus, the present invention provides a seal for prefabricated concrete elements, wherein it is possible in a simple way to provide an adaption to attachment elements designed in different ways in which for example jointing lengths and space widths are different while the sealing function is unaltered. This is provided by the fact that the sealing element according to the invention by contrast with previously known sealing elements is not manufactured in one piece but consists of two portions, an elastomeric body and an attachment element. In respect of the attachment element different embodiments are suggested which differs from each other with regard to their dimensions and material composition so that there are provided after the composition of the seal dependent on the different dimensions and material composition provided different compression properties of the completed seal so that the sealing force and thereby the tightness of the completed seal consisting of attachment portion and elastomeric body can be adapted to the different portions which shall be connected with each other.

We claim:

1. A seal between two portions one introducible in the other, said seal comprising:
  a) an elastomeric body which consists essentially of a wedge-shaped cross-section and has a wedge edge end, a wedge base end, a bearing surface and a sliding surface, the wedge edge end being positioned at the front in the direction of the introduction of the two portions one in the other, and the wedge base end having an introduction opening to a reception space; and
  b) a separate, completely detachable attachment portion which is adapted to control the degree of compression of the elastomeric body and the forces established as a consequence of the introduction of the two portions one in the other, said attachment portion being releasably anchored in the reception space.

2. The seal as claimed in claim 1 wherein said elastomeric body further comprises a flap of elastomeric compression material disposed between said sliding surface and said reception space and said attachment portion extends over approximately a half of the length of the elastomeric body in the direction of introduction of two portions one in the other; said attachment portion having an engagement surface for compressive engagement with said flap, said engagement surface being positioned between said sliding surface and said bearing surface and between said wedge edge end and said wedge base end.

3. The seal as claimed in claim 2 wherein said engagement surface has an area which is variably distant from said bearing surface and is more distant from said bearing surface nearer said wedge base end.

4. The seal as claimed in claim 2 wherein said reception space has a shoulder for anchoring said attachment portion.

5. The seal as claimed in claim 4 wherein said shoulder is disposed near said wedge base end and said introduction area includes a passage oriented generally transverse to said bearing surface.

6. The seal as claimed in claim 5 wherein said shoulder is disposed in a central portion of said elastomeric body relative to said wedge edge end and said wedge base end and said attachment portion has a corresponding anchorage portion.

7. The seal as claimed in claim 2 wherein the reception space has a lubricant area for distributing lubricant between the flap and said attachment portion when the two portions introducible one into the other are jointed with the seal positioned therebetween.

8. The seal as claimed in claim 2 further comprising an alternative attachment portion, said alternative attachment portion having one of its dimensions and hardness differ from said attachment portion whereby said elastomeric body can accommodate different space widths between the two portions introducible one into the other.

9. The seal as claimed in claim 2 wherein said attachment portion further comprises a sliding jacket.

10. A seal between two portions one introducible in the other, said seal comprising:
  a) an elastomeric body which is of wedge-shaped cross-section and has a wedge edge end, a wedge base end, a bearing surface and a sliding surface, the wedge edge end being positioned at the front in the direction of the introduction of the two portions one in the other, and the wedge base end having an introduction opening to a reception space; and
  b) a separate, completely detachable attachment portion which is adapted to control the degree of compression of the elastomeric body and the forces established as a consequence of the introduction of the two portions one in the other, said attachment portion being releasably anchored in the reception space, the attachment portion having an anchorage portion and a sliding jacket, the anchorage portion being adapted to be fastened in the correspondingly shaped reception space in the elastomeric body and the sliding jacket being adapted to be folded over the sliding surface of the elastomeric body.

11. A seal as claimed in claim 10, characterized in that the sliding jacket is formed as a hose filled with a lubricant.

12. A seal as claimed in claim 10, characterized in that the sliding jacket is formed as a flap.

13. A set of reconfigurable seals each adapted to seal the space between two portions, one introducible in the other, said set of seals comprising:

at least one elastomeric body of wedge-shaped cross-section having a wedge edge end, a wedge base end, a bearing surface and a sliding surface, the wedge edge end being positioned at the front in the direction of the introduction of the two portions one into the other, and the wedge base end having an introduction opening to a reception space; and a set of separate, completely detachable attachment portions each having an anchorage portion that is adapted to be releasably fastened in the reception space whereby an attachment portion selected from said set of attachment portions is thereby releasably attached to said body to thereby control the degree of compression of the elastomeric body and the forces established as a consequence of the introduction of the two portions one in the other, said attachment portions having different sliding jackets each adapted to be folded over the sliding surface of the elastomeric body when the respective attachment portion is attached to said body in order to adapt to different jointing lengths and space widths of the two portions introducible one into the other.

14. The set of reconfigurable seals as claimed in claim 13 wherein said sliding jackets are each formed as a hose filled with a lubricant.

15. The set of reconfigurable seals as claimed in claim 13 wherein each said sliding jacket is formed as a flap.

* * * * *